J. SLEPIAN.
CIRCUIT INTERRUPTER.
APPLICATION FILED JAN. 14, 1918.
1,338,334.
Patented Apr. 27, 1920.
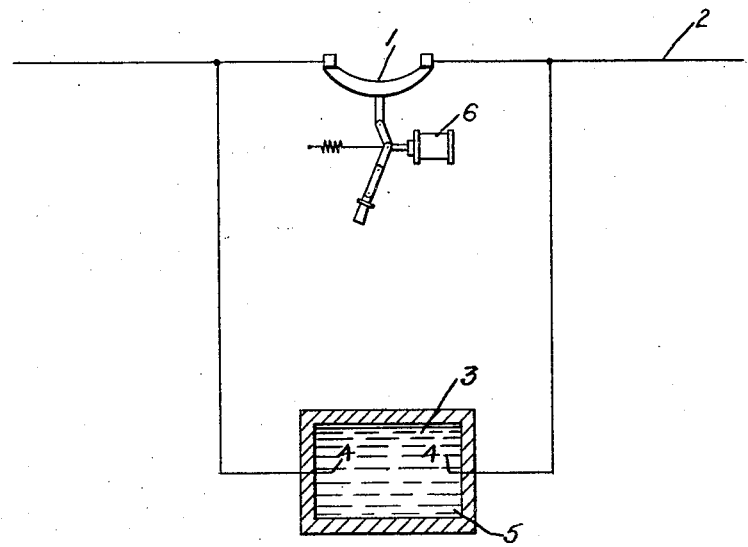
WITNESSES:
INVENTOR
Joseph Slepian
BY
ATTORNEY

UNITED STATES PATENT OFFICE.

JOSEPH SLEPIAN, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER.

1,338,334.  Specification of Letters Patent.  Patented Apr. 27, 1920.

Application filed January 14, 1918. Serial No. 211,705.

*To all whom it may concern:*

Be it known that I, JOSEPH SLEPIAN, a citizen of the United States, and a resident of Pittsburgh, in the county of Allegheny and State of Pennsylvania, have invented a new and useful Improvement in Circuit-Interrupters, of which the following is a specification.

My invention relates to circuit interrupters and particularly to methods of, and means for, dissipating the electromagnetic energy of a circuit when its interrupter is opened.

One object of my invention is to provide means responsive to increase in temperature for gradually increasing the resistance of a path that is connected in shunt relation to a circuit interrupter for dissipating the energy of the circuit after the interrupter is opened.

Another object of my invention is to provide a device, of the above-indicated character, that shall be simple and inexpensive to construct and effective in its operation.

In practising my invention, I provide an inclosed receptacle having electrodes therein that are connected in shunt relation to a circuit interrupter. The receptacle is filled with a solution of water and manganese sulfate, or other similar substance, that is adapted, at predetermined temperatures, to precipitate such substance and thereby offer an intimate resistance to the flow of current therethrough.

The single figure of the accompanying drawing is a diagrammatic view of a circuit interrupter embodying my invention.

A circuit interrupter 1 is operatively connected to one conductor of a circuit 2, and an inclosed explosion-proof receptacle 3 is provided with electrodes 4 that are connected in shunt relation to the interrupter 1. The receptacle 3 is filled with a solution 5 of water and manganese sulfate, or other similar substance.

When the circuit interrupter 1 is opened, by reason of the deënergization of its holding coil 6, or other well known means, the current traversing the conductor 2 is caused to flow through the solution 5 which is of such characteristic that, when it is heated by the current traversing the same, it changes gradually from an electrolyte to a non-conductor, by reason of the precipitation therein. Thus, at substantially 200° C., when magnesium sulfate is used, a substantially infinite resistance is offered to the flow of current therethrough. By the use of such a device, the circuit may be effectively interrupted without subjecting the contact members of the circuit interrupter to destruction by reason of the electromagnetic energy tending to maintain the current after the circuit interrupter is tripped.

I do not limit my invention to the form of device illustrated nor to the substance herein specified, as various modifications may be made therein without departing from the spirit and scope of the invention as set forth in the appended claims.

I claim as my invention:

1. The combination with an electric circuit and an interrupter therefor, of a device connected in shunt relation to the interrupter comprising a solution of manganese sulfate that is adapted to become a non-conductor when current traverses the same, incident to the opening of the interrupter.

2. The combination with an electric circuit and an interrupter therefor, of a device connected in shunt relation to the interrupter comprising a sulfate solution that is so precipitated, when heated to a predetermined temperature incident to passage of current therethrough when the interrupter is opened, that it offers infinite resistance to the flow of current through the circuit.

3. The combination with an electric circuit and an interrupter therefor, of a device connected in shunt relation to the interrupter comprising a sulfate solution that is so precipitated, when heated to a predetermined temperature incident to passage of current therethrough when the interrupter is opened, that it dissipates the energy of the circuit.

4. The combination with an electric circuit and an interrupter therefor, of a device connected in shunt relation to the interrupter comprising a solution of manganese sulfate which offers an infinite resistance to the flow of current through the circuit after the interrupter has been opened a sufficient time to permit the current to heat the solution.

5. The combination with an electric circuit and an interrupter therefor, of a device connected in shunt relation to the interrupter comprising a solution of manganese sulfate which precipitates out to constitute a non-conductor after the interrupter has been opened a sufficient time to permit the line current to heat the solution.

6. The combination with an electric circuit and a circuit interrupter therefor, of a device connected in shunt relation thereto comprising an inclosed receptacle, electrodes and a manganese sulfate solution therein, said solution being adapted to be so heated, when current traverses the same incident to opening the interrupter, that it precipitates out and offers resistance to the flow of current through the circuit.

7. The combination with an electric circuit and an interrupter therefor, of a device connected in shunt relation to the interrupter comprising an electrolyte that is adapted to precipitate out to become a nonconductor when heated incident to the passage of current therethrough after the interrupter is opened.

In testimony whereof, I have hereunto subscribed my name this 31st day of Dec. 1917.

JOSEPH SLEPIAN.